(12) United States Patent
Duvall et al.

(10) Patent No.: US 10,473,540 B2
(45) Date of Patent: Nov. 12, 2019

(54) GAS STRUT FORCE ACTIVE MONITOR SYSTEM

(71) Applicant: GM GLOBAL TECHNOLOGY OPERATIONS LLC, Detroit, MI (US)

(72) Inventors: Jacob Duvall, Royal Oak, MI (US); Himanshu H. Mehta, Ann Arbor, MI (US); Jason L. Hepner, Davisburg, MI (US); Jason Miller, St. Clair Shores, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 244 days.

(21) Appl. No.: 15/693,912

(22) Filed: Sep. 1, 2017

(65) Prior Publication Data

US 2019/0072442 A1    Mar. 7, 2019

(51) Int. Cl.
*G01L 1/22* (2006.01)
*G01B 7/16* (2006.01)
*G01M 99/00* (2011.01)

(52) U.S. Cl.
CPC .............. *G01L 1/2287* (2013.01); *G01B 7/18* (2013.01); *G01M 99/007* (2013.01)

(58) Field of Classification Search
CPC ....... G01L 1/2287; G01L 1/2218; G01B 7/18; G01M 99/007
See application file for complete search history.

(56) References Cited

U.S. PATENT DOCUMENTS 10,119,591 B1 * 11/2018 Duvall ................. F16F 9/3292
10,260,589 B2 * 4/2019 Duvall ................. F16F 9/0218

* cited by examiner

*Primary Examiner* — Freddie Kirkland, III
(74) *Attorney, Agent, or Firm* — Cantor Colburn LLP

(57) ABSTRACT

A gas strut monitoring system includes a gas strut. The monitoring system further includes a knuckle assembly connected to a base end of the gas strut. The knuckle assembly includes at least one strain gauge and a deformable knuckle. The system also includes a controller in communication with the at least one strain gauge, which is configured to measure a deformation of the deformable knuckle via the strain gauge. The system evaluates, based on the measured deformation, an operative performance of the gas strut. The system then outputs signal to an output device that indicates a maintenance recommendation based on the operative performance of the gas strut.

17 Claims, 4 Drawing Sheets

GAS STRUT FORCE ACTIVE MONITOR SYSTEM

INTRODUCTION

The subject disclosure relates to gas struts, and more particularly to gas strut force monitoring systems.

Gas struts are known to include a piston assembly that reciprocates within a pressure chamber defined by a housing. Typically, the pressure chamber contains an inert gas, such as nitrogen, that is mechanically compressed to exert force on the piston in the chamber. The piston assembly includes an enlarged head that slides within the housing, and a rod that extends from the head and out through one end of the housing. In operation, as the rod retracts within the housing, the total volume of the pressure chamber is reduced thus increasing the gas pressure within the chamber. The piston head may include valves or openings that communicate axially through the piston head to control and establish pressure equilibrium on both sides of the piston head regardless of the axial location of the head during a strut cycle. Because the surface area on a leading side of the piston head is larger than a surface area of the other side (i.e., the side that the rod attaches to), axial forces may not be equivalent. Therefore, as pressure increases within the pressure chamber as the strut retracts, a force that resists the retraction increases tending to bias the strut toward a fully extended position.

Regardless of gas strut position, the positive gas pressure within the gas strut transfers axial forces to the connecting knuckle that attaches the strut to the movable door, fixture, liftgate, etc. As the seal wears, or through other components that may wear or require maintenance over time, the gas pressure in the pressure chamber may decrease with increasing wear on the seal. For example, a twenty percent decrease in gas pressure may be significant in some applications, and if the degraded pressure condition is known, the decreased pressure may lead to strut maintenance or replacement. Unfortunately, known means to determine degraded gas pressure is limited and/or impractical.

Accordingly, an active strut wear monitoring system for gas struts is desirable.

SUMMARY

In one exemplary embodiment a gas strut monitoring system includes a gas strut. The monitoring system further includes a knuckle assembly connected to a base end of the gas strut. The knuckle assembly included at least one strain gauge and a deformable knuckle. The system also includes a controller in communication with the at least one strain gauge, which is configured to measure a deformation of the deformable knuckle via the strain gauge. The system evaluates, based on the measured deformation, an operative performance of the gas strut. The system then outputs signal to an output device that indicates a maintenance recommendation based on the operative performance of the gas strut.

In another exemplary embodiment, a method for active monitoring a performance of a gas strut includes measuring, via a processor, a deformation of a deformable knuckle in communication with a gas strut via a strain gauge attached to the deformable knuckle. According to this method, the processor evaluates, based on the measured deformation of the deformable knuckle, an operative performance of the gas strut, and outputs a signal to an output device indicative of a maintenance recommendation based on the operative performance of the gas strut.

In another exemplary embodiment the strain gauge is a foil-based strain gauge permanently attached to an exterior surface of the knuckle assembly.

In another exemplary embodiment the knuckle assembly includes a knuckle that is attachable to the gas strut and a connecting member, such that the knuckle is deformable by a force applied to the knuckle by the gas strut, and a deformation of the knuckle is related to the operative performance of the gas strut.

In yet another exemplary embodiment, the knuckle includes two opposite concave walls connecting an upper knuckle portion and a lower knuckle portion, and the concave walls are deformable by the force applied to the knuckle by the gas strut.

In another embodiment, the knuckle includes a single middle post connecting an upper knuckle portion and a lower knuckle portion, and the middle post is deformable by the force applied to the knuckle by the gas strut.

In yet another exemplary embodiment, the controller is configured to, at a predetermined time interval, output, at each time interval, an excitation voltage, transmit the excitation voltage to the strain gauge, and receive a response voltage from the strain gauge, then evaluate, based on a plurality of received response voltages, an average deformation of the deformable knuckle over two or more multiples of the predetermined time interval. According to this embodiment, the controller then determines the operative performance of the gas strut using the average deformation of the deformable knuckle.

The above features and advantages, and other features and advantages of the disclosure, are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
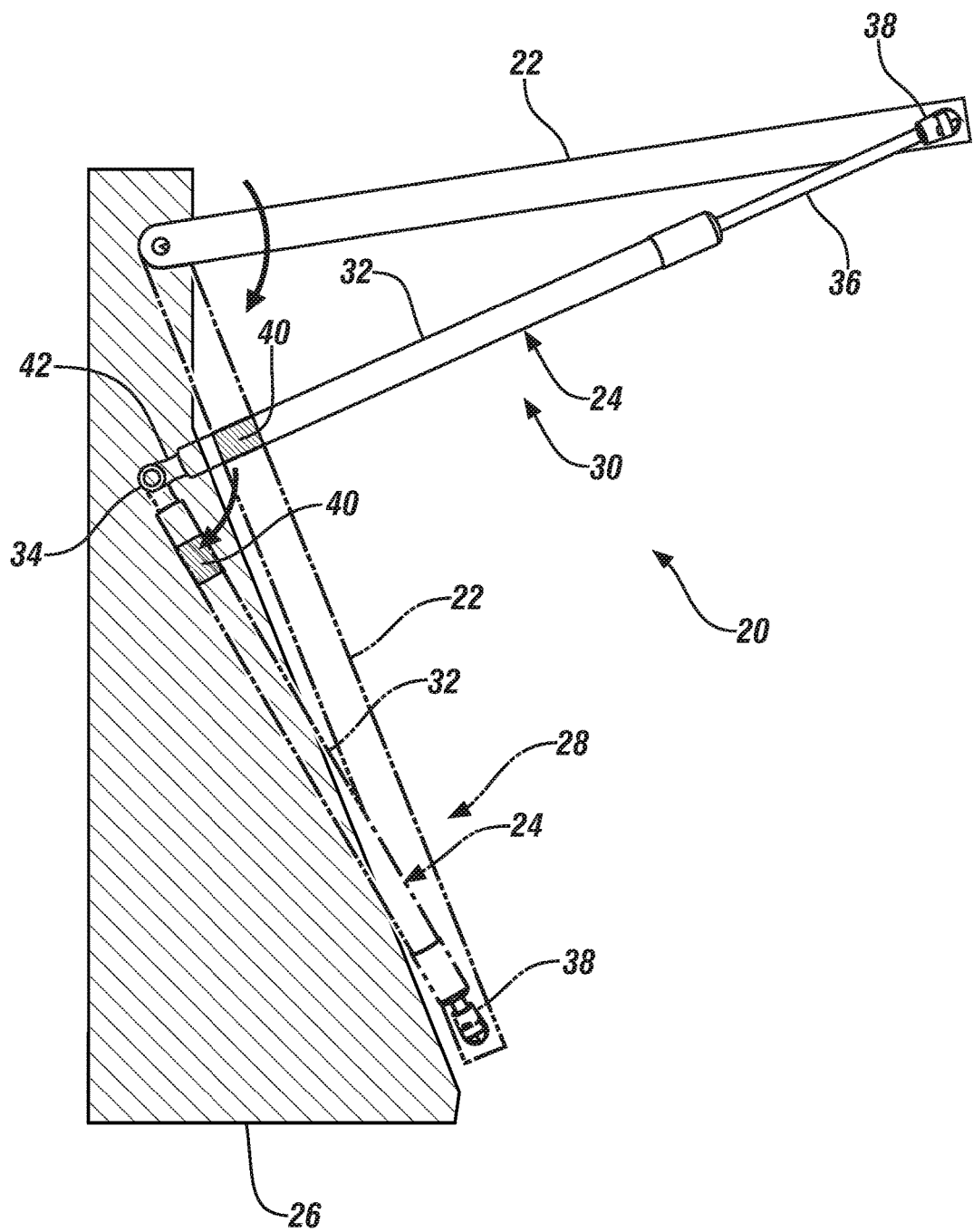
FIG. 1 is a schematic view of a gas strut assembly utilized with a vehicle liftgate.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 illustrates a gas strut assembly 20 that may be applied to a vehicle frame 26 of a vehicle, and more specifically, to a vehicle liftgate 22. In this example, a gas strut 24 of the gas strut assembly 20 may extend between and may be pivotally engaged to the liftgate 22 and the vehicle frame 26. The gas strut 24 facilitates the lifting, and thus opening, of the liftgate 22 as the gas strut 24 pivotally moves from a retracted position 28 (i.e., illustrated in phantom) to an extended position 30. In this and/or other applications, the gas strut 24 may be a gas spring, a gas damper, a shock absorber, and other similar embodiments.

Figure 2:
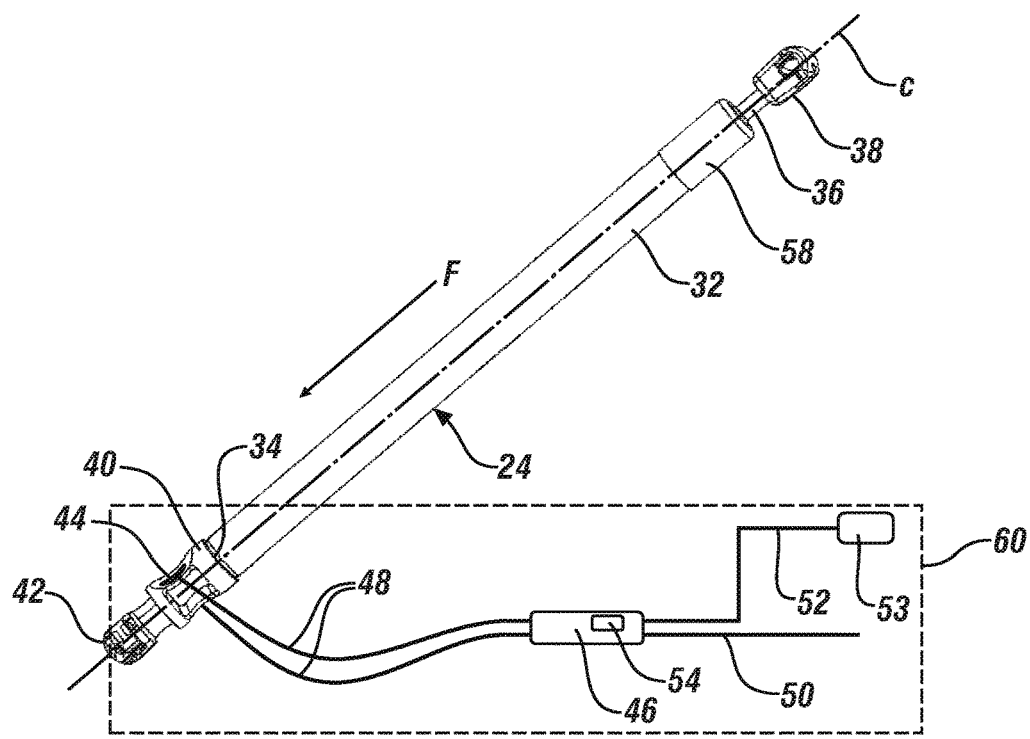
FIG. 2 is a schematic view of a partial gas strut assembly with an active gas strut monitor system according to embodiments.

Referring to FIG. 2, the gas strut 24 may include a housing 32 that may be a cylinder. The piston assembly (internal to gas strut 24 and thus not shown) reciprocates along a centerline (C) within the housing 32. The housing 32 includes a cylindrical inner surface (not shown) that faces radially inward and may be cylindrical, which seals against a reciprocating piston seal (not shown) to allow the gas to perform the work of the piston. Although the inner working portions of gas strut are generally referred to herein, those skilled in the art appreciate the general functionality and dampening ability of the gas strut 24, and as such, it is not explicitly described for the sake of brevity.

Referring to FIGS. 1 and 2, a piston rod 36 is attached to the reciprocating piston (not shown) internal to housing 32, which is configured to be the extending portion that reciprocates along an axial length of gas strut 24. In operation, the piston and reciprocating piston slide upon the inner surface of the housing 32, and a gas controllably flows through openings in the piston head from one side of the piston head to the other, as the piston assembly (and piston rod 36) reciprocates between the retracted and extended positions 28, 30 (see FIG. 1). The resistant forces of the compressed gas flowing through the piston exerts the working force on piston rod 36 and housing 32, respectively, depending on the direction of movement of piston rod 36.

The piston rod 36 includes a first end (internal to housing 32 and not shown) attached to the internal piston and an opposite second end 38 of piston rod 36 that is pivotally engaged to the liftgate 22. The housing 32 further includes a sealed base end 34 of the housing 32 that attaches to a knuckle 40. The knuckle 40 attaches to a strut end 42 that may be pivotally engaged to the vehicle frame 26.

In operation, the piston rod 36 transfers working force to the end 38 of the piston rod 36, and to the vehicle frame 26 through the base end 34. That force transfers to the knuckle 40 and strut end 42, respectively. That is to say, in operation the housing 32 acts on the knuckle 40, which then acts on the strut end 42, and finally the base end 34 that may be pivotally attached to the vehicle frame 26. According to embodiments, an active monitor system 60 (hereafter "monitor system 60") may be configured to detect and evaluate strain on the knuckle 40 to predict or alert to a need for maintenance or replacement of one or more parts of the gas strut 24.

According to embodiments, the monitor system 60 includes one or more strain gauges 44 (collectively "strain gauge 44" as shown in FIG. 2) that are attachable to the knuckle 40 such that the strain gauge 44 can measure a strain of the knuckle 40 as working force F is transferred from the housing 32, through the knuckle 40 and the strut end 42. The strain gauge 44 is in communication with a controller 46 via one or more sensor channels 48. The controller 46 may connect to a vehicle power bus 50, and a vehicle control module bus 52 connecting the controller 46 to a vehicle control module or output device 53. The vehicle control module or output device 53 may be, for example, a vehicle control module, and/or an output device configured to output messages to a vehicle user or maintenance personnel as known by those skilled in the art.

The controller 46 may be a vehicle control module such as, for example, a body control module. In some aspects, controller 46 includes a processor 54. Processor 54 can be any type of suitable processing device capable of processing electronic instructions including, but certainly not limited to, microprocessors, microcontrollers, host processors, controllers, vehicle communication processors, and application specific integrated circuits (ASICs). Alternatively, the processor 54 can work in conjunction with some type of central processing unit (CPU) or other component performing the function of a general purpose processor. The controller 46 includes a data acquisition device (DAQ) configured for sampling electrical signals, and converting analog waveforms into digital values.

The strain gauge 44 may be a foil strain gauge based transducer, or other suitable gauge. The strain gauge 44 can be attached to the knuckle 40 using any suitable means such as, for example, epoxy, cyanoacrylate glue, or another method for attaching foil-based sensors to metallic components.

Figure 3A:
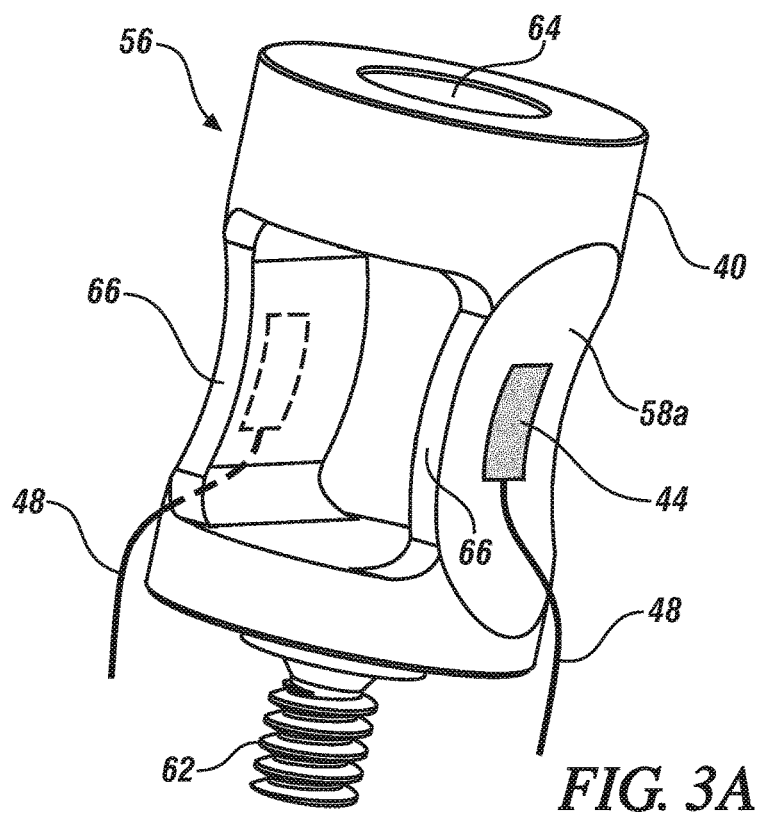
FIG. 3a is a schematic view of an exemplary knuckle assembly, according to embodiments.
Figure 3B:
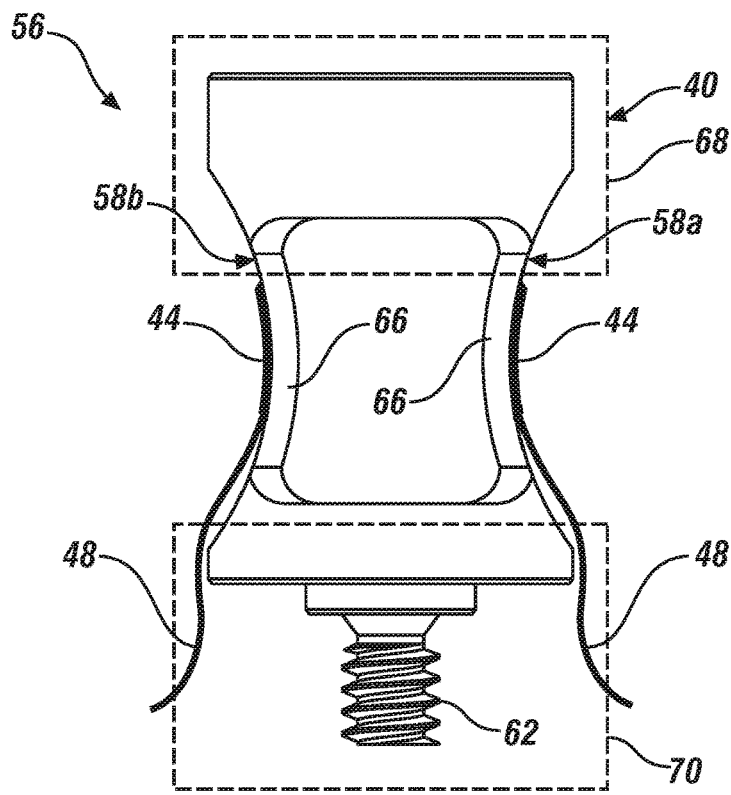
FIG. 3b is another schematic view of the knuckle assembly of FIG. 3a, according to embodiments.
Figure 3C:
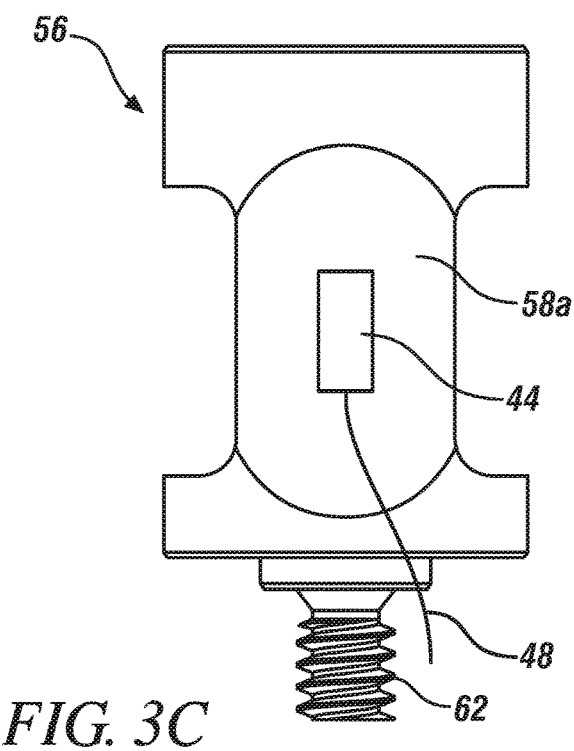
FIG. 3c is another schematic view of the knuckle assembly of FIG. 3a, according to embodiments.

FIG. 3A depicts a schematic view of a knuckle assembly 56 according to embodiments. FIGS. 3B and 3C depict front and side schematic views of the knuckle assembly 56, respectively. FIG. 2 and FIGS. 3A-3C will now be considered in conjunction with one another. Referring first to FIGS. 3A-3C, the knuckle 40 may be constructed with a cast or machined metal such as, for example, aluminum, steel, titanium, etc.

Figure 4A:
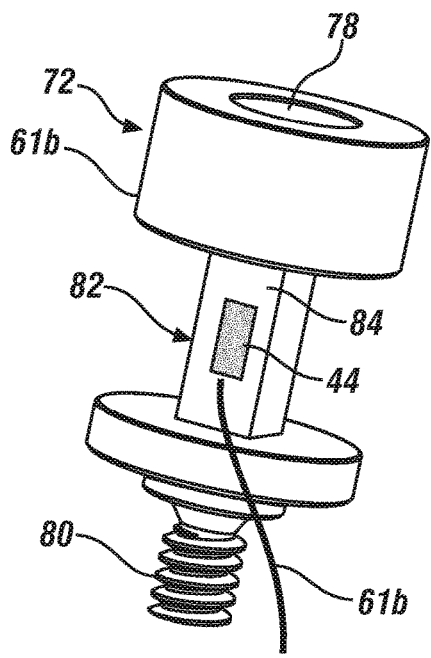
FIG. 4a is a schematic view of another exemplary knuckle assembly, according to another embodiment.
Figure 4B:
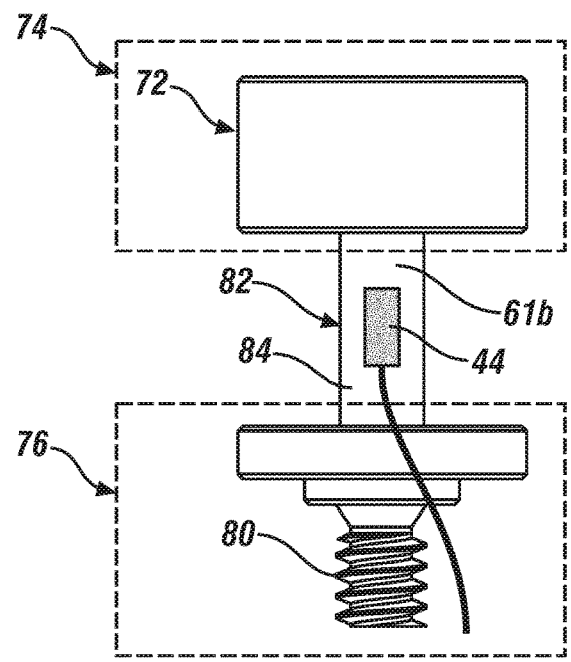
FIG. 4b is another schematic view of the knuckle assembly of FIG. 4a, according to another embodiment.

Looking at FIG. 3A, the knuckle assembly 56 is depicted with the one or more strain gauges 44 attached to one or more exterior surface(s) (such as exterior surface 58a). According to one embodiment, the exterior surface 58a is an exterior surface of one or more connecting portions 66, as shown in greater detail in FIGS. 3A-3C. FIG. 3B illustrates one or more connecting portions(s) 66 that connect an upper knuckle 68 to a lower knuckle 70. In other embodiments, connecting portion 66 may take another form such as, for example, a straight (not convex or concave) wall (not shown), or a center post 82 as shown in FIGS. 4A and 4B, which are described in greater detail hereafter. The knuckle 40 can include a fastening feature 62 for connecting the knuckle 40 with the strut end 42. In one embodiment, the fastening feature 62 is a male thread, as shown in FIGS. 3A-3C. In other embodiments, fastening feature 62 can be any form or device known in the art for rigidly fastening, such as (for example) a post for receiving a pin or retaining clip, a press-fit feature, etc. The knuckle 40 also includes a second fastening feature 64 (FIG. 3A) that may be, for example, a threaded opening or other known fastening means for fastening the knuckle 40 to the base end 34 of the housing 32. One benefit of the knuckle assembly 56 depicted in FIGS. 3A-3C is the ability to be exchanged with (or connected to) another gas strut if gas strut 24 is replaced, without needing to replace and re-wire the strain gauge 44.

FIG. 3B depicts a front schematic view of the knuckle 40. The knuckle assembly 56 can include a plurality of sensors (e.g., the strain gauge 44, depicted collectively as two foil-based strain gauge sensors permanently connected to first and second exterior surfaces 58a and 58b, respectively).

In general, strain gauges measure force when applied to a body by measuring deformation on that body. In a general case, that deformation is referred to as strain. According to embodiments of the present disclosure, the strain measurement of knuckle 40 can be measured in terms of deformation per unit length, and may measure either tensile (positive) or compressive (negative) strain.

Transducer-type strain gauges are a class of strain measurement devices that produce a signal based on changes to electrical resistance in a wire or metallic foil. The strain gauge(s) 44 may be transducer-type strain gauges that are operatively connected with controller 46 (FIG. 2). As shown in FIG. 3C, the strain gauge 44 can be rigidly fastened to one or more exterior surfaces of the knuckle 40 (e.g., 58*a* and 58*b*). Although two sensors (strain gauge 44) are shown, embodiments contemplate a single sensor, or more than two sensors, all of which connecting to controller 46 as shown in FIG. 2.

When an excitation voltage is applied to the input lead(s) of the strain gauge 44, an output response can be measured and correlated by the controller 46 to known values for part fatigue, malfunction, etc. For example, controller 46 may produce a 5 volt excitation signal and apply the signal to an input lead of sensor channels 48. In response to the excitation signal, one or more output leads (e.g., sensor channels 48) returns a signal having a voltage indicative of a relative strain in the knuckle 40. One or more measurements can indicate a force F (FIG. 2) output in the gas strut 24. For example, a 5 volt excitation signal may result in a feedback voltage measurement having the units of millivolts/volt (mV/V).

The signal voltage is correlated by the controller 46 to a known value or set of values indicative of the pressure exerted by compressed gas in the gas strut 24. In some aspects, controller 46 includes a computer memory (not shown) storing one or more lookup tables configured with values for known strain measurements correlated with one or more probability of part failure. Accordingly, the processor 54 may determine a strain acting on the knuckle 40, and a corresponding indication of a relative performance of the gas strut 24.

Referring again to FIGS. 1 and 2, according to one embodiment, when the gas strut 24 is in the fully-retracted position 28 (FIG. 1), the controller 46 may monitor the strain of knuckle 40 at a predetermined time interval. For example, controller 46 may monitor compression strain every 1 minute. After a number of measurements are taken (e.g., 5, 10, 20 measurements, etc.), a raw data value of average strain is compared by the controller 46 to a predefine value. If the controller 46 determines that the gas strut 24 exceeds a predetermined threshold of minimum compression strain (e.g., the force F is not at least a minimum acceptable (predetermined) value), the controller 46 may determine that the gas strut 24 is not performing within an optimal range of performance. In one aspect, the controller 46 may output a message to an operatively connected output device in the vehicle indicating a recommendation or alert to action. One example of an alert may be a recommendation to replace one or more gas struts. Another example of an alert may be a recommendation to perform service to one or more gas struts.

FIGS. 4A and 4B depict schematic views of a knuckle assembly 72, according to another embodiment. FIG. 4A shows a perspective view of the knuckle assembly 72 in which fastening feature 78 is shown in an upper knuckle portion 74. As in the previous embodiments, the fastening feature 78 may be a threaded hole or other fastening means for fastening the knuckle assembly 72 to a gas strut assembly (e.g., the gas strut assembly 20). Fastening feature 80 is shown as a threaded post. In the embodiment depicted in FIGS. 4A and 4B, the upper knuckle portion 74 connects to the lower knuckle portion 76 via a center post 82. Accordingly, the strain gauges 44 are fastened to one or more exterior surfaces 84 of the center post 82. In one embodiment, the center post 82 is a square connecting member. In other aspects, the center post 82 may be rectangular or round in shape.

Figure 5:
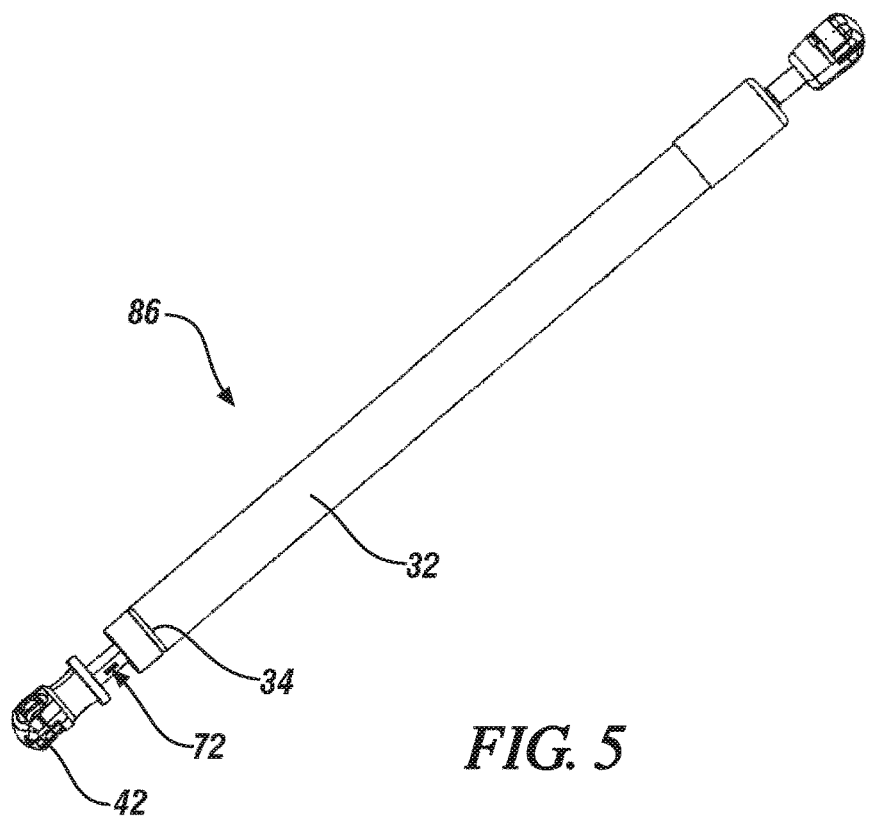
FIG. 5 is a schematic view of a gas strut assembly with the knuckle assembly of FIG. 4a installed, according to another embodiment.

FIG. 5 depicts a schematic view of a gas strut assembly 86 with the knuckle assembly 72 installed between the base end 34 of the housing 32 and the strut end 42.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A gas strut monitoring system comprising:
a gas strut;
a knuckle assembly connected to a base end of the gas strut, wherein the knuckle assembly comprises at least one strain gauge and a deformable knuckle; and
a controller in communication with the at least one strain gauge, configured to:
measure a deformation of the deformable knuckle via the strain gauge;
evaluate, based on the measured deformation, an operative performance of the gas strut; and
output an output signal to an output device indicative of a maintenance recommendation based on the operative performance of the gas strut.

2. The system of claim 1, wherein the at least one strain gauge is a foil-based strain gauge permanently attached to an exterior surface of the knuckle assembly.

3. The system of claim 1, wherein the knuckle assembly comprises a knuckle that is attachable to the gas strut and a connecting member, such that the knuckle is deformable by a force applied to the knuckle by the gas strut, and a deformation of the knuckle is related to the operative performance of the gas strut.

4. The system of claim 3, wherein the knuckle comprises two opposite concave walls connecting an upper knuckle portion and a lower knuckle portion, and the concave walls are deformable by the force applied to the knuckle by the gas strut.

5. The system of claim 3, wherein the knuckle comprises a single middle post connecting an upper knuckle portion and a lower knuckle portion, and the middle post is deformable by the force applied to the knuckle by the gas strut.

6. The system of claim 1, wherein the controller is configured to, at a predetermined time interval:
output, at each time interval, an excitation voltage, transmit the excitation voltage to the strain gauge, and receive a response voltage from the strain gauge;
evaluate, based on a plurality of received response voltages, an average deformation of the deformable knuckle over two or more multiples of the predetermined time interval; and determine the operative performance of the gas strut using the average deformation of the deformable knuckle.

7. A knuckle assembly for active measurement of a gas strut comprising:
   a knuckle comprising an upper knuckle portion that is removably connectable to a gas strut assembly;
   a lower knuckle portion that is removably connectable to a strut end; and
   at least one connecting member in communication with and between the upper knuckle portion and the lower knuckle portion; and
   at least one strain gauge in communication with the at least one connecting member, wherein the at least one strain gauge is permanently affixed to a surface of the at least one connecting member.

8. The knuckle assembly of claim 7, wherein the at least one strain gauge is a foil-based strain gauge permanently attached to an exterior surface of the knuckle assembly.

9. The knuckle assembly of claim 7, wherein the knuckle is attachable to the gas strut and the at least one connecting member, such that the at least one connecting member is deformable in response to a force applied to the upper knuckle portion by the gas strut.

10. The knuckle assembly of claim 7, wherein the at least one connecting member comprises two opposing concave walls connecting the upper knuckle portion and the lower knuckle portion, and the two opposing concave walls are deformable in response to a force applied to the upper knuckle portion by the gas strut.

11. The knuckle assembly of claim 7, wherein the at least one connecting member comprises a single middle post connecting the upper knuckle portion and the lower knuckle portion, and the middle post is deformable by a force applied to the knuckle by the gas strut.

12. The knuckle assembly of claim 7, further comprising at least one output channels configured to connect the at least one strain gauge to a controller, wherein the controller can be configured to:
   measure a deformation of the knuckle via the at least one strain gauge;
   evaluate, based on the measured deformation, an operative performance of the gas strut; and
   output, via the controller, an output signal to an output device indicative of a maintenance recommendation based on the operative performance of the gas strut.

13. A method for active monitoring a performance of a gas strut comprising:
   measuring, via a processor, a deformation of a deformable knuckle in communication with a gas strut via a strain gauge attached to the deformable knuckle;
   evaluating, via the processor, based on the measured deformation of the deformable knuckle, an operative performance of the gas strut; and
   outputting, via the processor, an output signal to an output device indicative of a maintenance recommendation based on the operative performance of the gas strut.

14. The method of claim 13, wherein measuring the deformation of the deformable knuckle comprises:
   measuring the deformation of the deformable knuckle via the strain gauge permanently attached to an exterior surface of the deformable knuckle, wherein the deformation of the knuckle is related to the operative performance of the gas strut.

15. The method of claim 14, wherein the processor is configured to measure deformation of two opposite concave walls connecting an upper knuckle portion and a lower knuckle portion, and the two opposite concave walls are deformable by a force applied to the knuckle by the gas strut.

16. The method of claim 14, wherein measuring the deformation comprises:
   measuring, via the processor, a deformation of a single middle post connecting an upper knuckle portion and a lower knuckle portion, wherein the processor is configured to measure the deformation of the middle post by a force applied to the knuckle by the gas strut.

17. The method of claim 13, comprising:
   outputting, via the processor, an excitation voltage at a predetermined time interval, transmitting the excitation voltage to the strain gauge at each time interval, and receiving a response voltage from the strain gauge at each time interval;
   evaluating, via the processor, based on a plurality of received response voltages, an average deformation of the deformable knuckle over two or more multiples of the predetermined time interval; and
   determining, via the processor, the operative performance of the gas strut using the average deformation of the deformable knuckle.

* * * * *